(12) United States Patent
Chen et al.

(10) Patent No.: US 8,437,717 B2
(45) Date of Patent: May 7, 2013

(54) METHOD AND APPARATUS FOR REPORTING STATE INFORMATION

(75) Inventors: Jian Feng Chen, Beijing (CN); Jun Li, Beijing (CN); Yun Tao Shi, Beijing (CN); Ning Liao, Beijing (CN)

(73) Assignee: Thomson Licensing (FR)

( * ) Notice: Subject to any disclaimer, the term of this patent is extended or adjusted under 35 U.S.C. 154(b) by 575 days.

(21) Appl. No.: 12/456,321

(22) Filed: Jun. 16, 2009

(65) Prior Publication Data

US 2009/0325526 A1 Dec. 31, 2009

(30) Foreign Application Priority Data

Jun. 26, 2008 (EP) ..................................... 08305333

(51) Int. Cl.
*H04B 17/00* (2006.01)
(52) U.S. Cl.
USPC ......... 455/226.1; 370/465; 370/469; 725/100
(58) Field of Classification Search ................ 455/226.1
See application file for complete search history.

(56) References Cited

U.S. PATENT DOCUMENTS

| | | | | | |
|---|---|---|---|---|---|
| 5,511,067 | A | * | 4/1996 | Miller | 370/335 |
| 5,706,290 | A | * | 1/1998 | Shaw et al. | 370/465 |
| 6,055,242 | A | * | 4/2000 | Doshi et al. | 370/458 |
| 6,148,005 | A | * | 11/2000 | Paul et al. | 370/469 |
| 6,862,270 | B1 | * | 3/2005 | Ho | 370/328 |
| 6,963,544 | B1 | * | 11/2005 | Balachandran et al. | 370/281 |
| 7,054,635 | B1 | * | 5/2006 | Ritzen et al. | 455/444 |
| 7,079,552 | B2 | * | 7/2006 | Cain et al. | 370/469 |
| 7,095,754 | B2 | * | 8/2006 | Benveniste | 370/465 |
| 7,130,473 | B2 | * | 10/2006 | Wu et al. | 382/238 |
| 7,139,283 | B2 | * | 11/2006 | Quigley et al. | 370/432 |
| 7,177,295 | B1 | * | 2/2007 | Sholander et al. | 370/338 |
| 7,181,170 | B2 | * | 2/2007 | Love et al. | 455/67.13 |
| 7,313,814 | B2 | * | 12/2007 | Zhu et al. | 726/6 |
| 7,385,951 | B2 | * | 6/2008 | Balachandran et al. | 370/329 |
| 7,394,826 | B2 | * | 7/2008 | Cain et al. | 370/469 |
| 7,397,819 | B2 | * | 7/2008 | Kobayashi | 370/469 |
| 7,460,543 | B2 | * | 12/2008 | Malik et al. | 370/395.4 |

(Continued)

FOREIGN PATENT DOCUMENTS

| EP | 1641302 | 3/2006 |
|---|---|---|
| WO | WO2007/046734 | 4/2007 |
| WO | WO2007/094734 | 8/2007 |

OTHER PUBLICATIONS

Bae et al., "Multiple Quality Image Contents Serivce System and Update Method Thereof", WO 2009/054586 A1, filed Jun. 9, 2008, WIPO, 21 pages.*

(Continued)

*Primary Examiner* — Hai V Nguyen
(74) *Attorney, Agent, or Firm* — Jack Schwartz and Associates, PLLC

(57) ABSTRACT

A method for reporting state information is provided. The receiver device receives a service, which is encoded in at least two layers over a communication channel, through a subset of said at least two layers; it measures a channel quality parameter; and in response to the channel quality parameter reaching a predetermined threshold value, it receives the service through a modified subset of the at least two layers as a function of the measured channel quality parameter and transmitting state information of the receiver device. Thus, the signal overhead is reduced.

6 Claims, 2 Drawing Sheets

U.S. PATENT DOCUMENTS

| | | | | |
|---|---|---|---|---|
| 7,460,553 | B2* | 12/2008 | Riveiro Insua et al. | 370/437 |
| 7,493,108 | B2* | 2/2009 | Beming et al. | 455/418 |
| 7,515,872 | B2* | 4/2009 | Hundscheidt et al. | 455/3.01 |
| 7,535,913 | B2* | 5/2009 | Minami et al. | 370/401 |
| 7,567,543 | B2* | 7/2009 | Cao et al. | 370/338 |
| 7,570,656 | B2* | 8/2009 | Raphaeli et al. | 370/445 |
| 7,602,843 | B2* | 10/2009 | Cho et al. | 375/228 |
| 7,609,652 | B2* | 10/2009 | Kellerer et al. | 370/252 |
| 7,643,560 | B2* | 1/2010 | Hong et al. | 375/240.25 |
| 7,656,815 | B2* | 2/2010 | Kellerer et al. | 370/252 |
| 7,756,206 | B2* | 7/2010 | Ridge et al. | 375/240.25 |
| 7,765,578 | B2* | 7/2010 | Tsuruga et al. | 725/142 |
| 7,778,217 | B2* | 8/2010 | Lee et al. | 370/328 |
| 7,787,896 | B2* | 8/2010 | Kundu et al. | 455/518 |
| 7,898,948 | B2* | 3/2011 | DiGirolamo et al. | 370/230 |
| 7,899,451 | B2* | 3/2011 | Hu et al. | 455/422.1 |
| 7,940,692 | B2* | 5/2011 | Igarashi et al. | 370/253 |
| 7,957,738 | B2* | 6/2011 | Rey et al. | 455/435.1 |
| 7,962,131 | B2* | 6/2011 | Lee et al. | 455/421 |
| 8,014,772 | B2* | 9/2011 | Beming et al. | 455/432.1 |
| 8,054,880 | B2* | 11/2011 | Yu et al. | 375/240.03 |
| 8,060,017 | B2* | 11/2011 | Schlicht et al. | 455/41.2 |
| 8,090,012 | B2* | 1/2012 | Cho et al. | 375/228 |
| 8,189,659 | B2* | 5/2012 | Han et al. | 375/240.02 |
| 8,223,670 | B2* | 7/2012 | Kazmi | 370/254 |
| 2002/0091991 | A1* | 7/2002 | Castro | 717/106 |
| 2002/0142721 | A1* | 10/2002 | Souissi et al. | 455/41 |
| 2004/0196972 | A1* | 10/2004 | Zhu et al. | 380/45 |
| 2005/0025047 | A1* | 2/2005 | Bodin et al. | 370/229 |
| 2005/0170782 | A1* | 8/2005 | Rong et al. | 455/67.11 |
| 2005/0198261 | A1* | 9/2005 | Durvasula et al. | 709/224 |
| 2005/0246749 | A1* | 11/2005 | Tsuruga et al. | 725/100 |
| 2006/0106865 | A1* | 5/2006 | Beming et al. | 707/104.1 |
| 2006/0126728 | A1* | 6/2006 | Yu et al. | 375/240.03 |
| 2006/0148411 | A1* | 7/2006 | Cho et al. | 455/67.13 |
| 2006/0232447 | A1* | 10/2006 | Walker et al. | 341/50 |
| 2006/0259627 | A1* | 11/2006 | Kellerer et al. | 709/227 |
| 2006/0268933 | A1* | 11/2006 | Kellerer et al. | 370/469 |
| 2007/0026803 | A1* | 2/2007 | Malm | 455/63.1 |
| 2007/0147320 | A1* | 6/2007 | Sattari et al. | 370/338 |
| 2007/0160083 | A1* | 7/2007 | Un et al. | 370/470 |
| 2007/0174474 | A1* | 7/2007 | Zhong et al. | 709/230 |
| 2007/0189304 | A1* | 8/2007 | Rosa | 370/395.21 |
| 2007/0213038 | A1* | 9/2007 | Masseroni et al. | 455/414.3 |
| 2008/0043688 | A1* | 2/2008 | Igarashi et al. | 370/338 |
| 2008/0056297 | A1* | 3/2008 | Gaur et al. | 370/447 |
| 2008/0076359 | A1* | 3/2008 | Charpentier et al. | 455/63.1 |
| 2008/0076432 | A1* | 3/2008 | Senarath et al. | 455/442 |
| 2008/0101470 | A1* | 5/2008 | Hong et al. | 375/240.14 |
| 2008/0109343 | A1* | 5/2008 | Robinson et al. | 705/37 |
| 2008/0132281 | A1* | 6/2008 | Kim et al. | 455/562.1 |
| 2008/0212583 | A1* | 9/2008 | Rey et al. | 370/390 |
| 2008/0293428 | A1* | 11/2008 | Rey et al. | 455/452.2 |
| 2009/0003306 | A1* | 1/2009 | Plutov et al. | 370/348 |
| 2009/0023453 | A1* | 1/2009 | Hu et al. | 455/452.1 |
| 2009/0083803 | A1* | 3/2009 | Alshaykh et al. | 725/62 |
| 2009/0092056 | A1* | 4/2009 | Kitazoe | 370/252 |
| 2009/0187960 | A1* | 7/2009 | Lee et al. | 725/131 |
| 2009/0219990 | A1* | 9/2009 | Han et al. | 375/240.02 |
| 2009/0303900 | A1* | 12/2009 | Cho et al. | 370/252 |
| 2009/0316835 | A1* | 12/2009 | Walker et al. | 375/320 |
| 2010/0067581 | A1* | 3/2010 | Hong et al. | 375/240.16 |
| 2010/0215099 | A1* | 8/2010 | Bae et al. | 375/240.11 |
| 2010/0220816 | A1* | 9/2010 | Walker et al. | 375/316 |
| 2010/0296428 | A1* | 11/2010 | Ho | 370/312 |
| 2011/0164527 | A1* | 7/2011 | Mishra et al. | 370/252 |
| 2011/0268110 | A1* | 11/2011 | Watson et al. | 370/352 |
| 2011/0298974 | A1* | 12/2011 | Garrido et al. | 348/441 |
| 2012/0011413 | A1* | 1/2012 | Liu et al. | 714/746 |

OTHER PUBLICATIONS

International Search Report Dated Dec. 5, 2008.

* cited by examiner

METHOD AND APPARATUS FOR REPORTING STATE INFORMATION

This application claims the benefit, under 35 U.S.C. §119 of EP Patent Application 08305333.0, filed Jun. 26, 2008.

TECHNICAL FIELD

The present invention relates to wireless communication, and more particularly, relates to a method and an apparatus for reporting state information of a receiver device.

BACKGROUND

The IEEE 802.16 standard specifies a fixed and mobile Broadband Wireless Access (BWA) standard for a wireless Metropolitan Area Network (MAN). The IEEE 802.16 standard defines different physical layer technologies for different frequency bands.

In current communication systems, multicast and broadcast techniques are employed for transmitting data from one source to multiple destinations. In order to effectively utilize radio resources, the IEEE 802.16e standard has introduced the Multicast and Broadcast Service (MBS) that standardizes the point to multi-point transmission in the mobile network. The MBS service may support not only the multicast and broadcast of low bit-rate message services such as text, but also the multicast and broadcast of high bit-rate multimedia services.

Layered coding is a data representation technique in which the source data is partitioned into multiple layers. The layers are organized normally in a way that the lowest layer also called base layer contains the minimum information for intelligibility; the other layers also called enhancement layers contain additional information that incrementally improves the overall quality of the source data. When the layered coding technique is applied in a video codec, the video data is normally encoded into multiple layers including a base layer of comparatively low quality video and at least one enhancement layer of increasingly higher quality video. At the receiver side of a layered coding communication system, a decoder can be configured to choose to decode a particular subset of these layers to get a particular quality of the video according to its preference and decoding capability.

Adaptive MCS (Modulation and Coding Scheme) is a key feature for WiMAX technology, wherein a higher level of MCS is employed in the area of good Signal to Noise Ratio (SNR); on the contrary, in the area of poor SNR, a relatively lower level of MCS is employed to guarantee the connection quality and link stability. In the MCS supported by the WiMAX, there are three categories of modulation types: QPSK (Quadrature Phase Shift Keying), 16QAM (Quadrature Amplitude Modulation) and 64QAM.

To implement the adaptive MCS, one of important requirements is to acquire accurate feedback report of channel quality from the Mobile Stations (MS). Two kinds of mechanisms are defined in the standard for the MS to report the DL (Download Link) CINR (Carrier to Interference and Noise Ratio) value to the Base Station (BS):

the first one is REP-RSP (Channel measurement Response) MAC message. The REP-RSP message in response to a REP-REQ message from the BS shall be sent by the MS to report estimation of the DL physical CINR or the effective CINR;

the second one is periodic CINR report with fast-feedback (CQICH) channel, wherein the BS may allocate a CQICH sub channel using a CQICH Control Information Element to provide a unicast uplink opportunity for periodic CINR reports (physical CINR or effective CINR), and the MS transmits channel quality information on the assigned CQICH of every frame.

The reporting messages sent by the MSs will cause a certain amount of signaling overhead as a function of the frequency of the polling and the total number of subscribers. Therefore, it is desirable to provide a method for reporting state information with a smaller signaling overhead.

SUMMARY

According to an aspect of present invention, it provides a method for reporting state information of a receiver device in a multicast or broadcast network. The method comprises the steps of: receiving a service, which is encoded in at least two layers over a communication channel, through a subset of said at least two layers; measuring a channel quality parameter (202); and in response to the channel quality parameter reaching a predetermined threshold value, receiving said service through a modified subset of said at least two layers as a function of said measured channel quality parameter and transmitting state information of the receiver device (203).

According to an aspect of the present invention, it provides a receiver device for reporting state information while receiving a service that is encoded into at least two layers in a multicast or broadcast network. The device comprises a channel estimation module and a service management module. The channel estimation module configured to measure the channel quality parameter of downlink channel, over which a service encoded in at least two layers is received through a subset of said at least two layers; and the service management module configured to transmit state information of said receiver device when changing to receive said service through a modified subset of said at least two layers in response to the measured channel quality parameter reaching a predetermined threshold value.

According to an aspect of the present invention, it provides a device for resource allocation in a multicast or broadcast network in which a service is encoded into at least two layers over a communication channel. The device comprises a first module and a second module. The first module configured to receive state information from at least one receiver device that is receiving said service through a subset of said at least two layers, wherein the state information is transmitted by the receiver device when changing to receive said service through a modified subset of said at least two layers in response to a channel quality parameter measured by the receiver device reaches a predetermined threshold value; and the second module configured to adjust resource allocation of all services as a function of the received at least one receiver device's state information.

According to an aspect of the present invention, because only the MSs that satisfy the requirement of reception condition information send the report message, the signaling overhead is greatly reduced.

It is to be understood that both the foregoing general description and the following detailed description of the present invention are explanatory and exemplary only.

BRIEF DESCRIPTION OF THE DRAWINGS

The accompanying drawings, which are included to provide a further understanding of the invention and are incorporated in and constitute a part of this application, illustrate embodiment of the invention together with the description which serves to explain the principle of the invention. Therefore, the invention is not limited to the embodiment. In the drawings.

DETAILED DESCRIPTION

The embodiment of the present invention will now be described in detail in conjunction with the drawings. In the following description, some detailed descriptions of known functions and configurations may be omitted for clarity and conciseness.

The embodiment is described in the context of a wireless network employing a layered coding technique. For an example, the documents IEEE Std 802.16e™-2005 and IEEE Std 802.16™-2004/Cor1-2005 (Amendment and Corrigendum to IEEE Std 802.16-2004), available from IEEE, 3 Park Avenue New York, N.Y. 10016-5997, USA and published on 28 Feb. 2006 define certain aspects of such a wireless network. The embodiment described herein is placed in the frame of a network based on these documents, along with the changes indicated in the description. However, the invention should not be limited to the described network.

Figure 1:
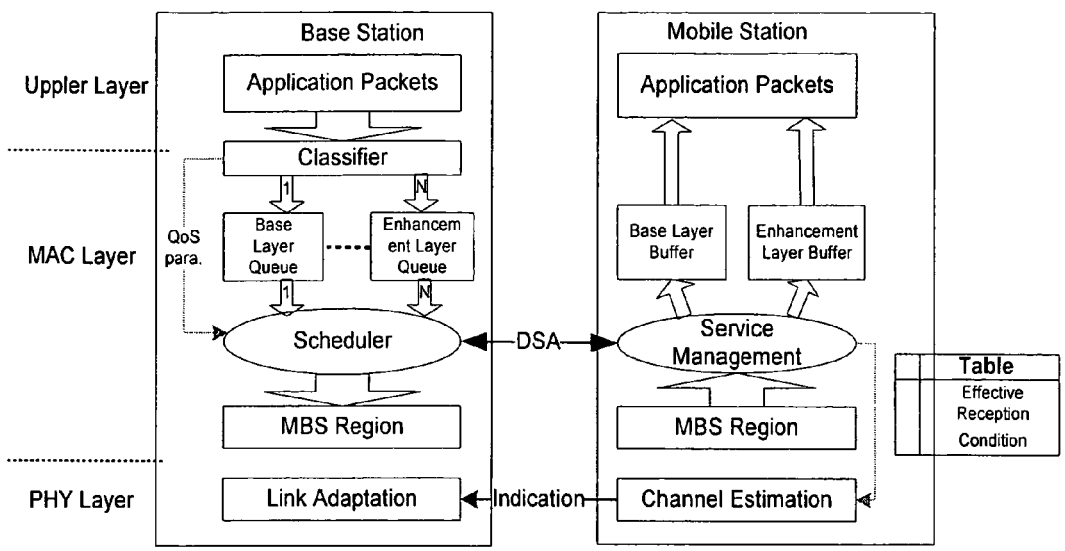
FIG. 1 is a block diagram schematically illustrating functional modules of the BS and the MS according to an embodiment of the present invention.

FIG. 1 is block diagram schematically illustrating the functional modules of the Base Station (BS) and the Mobile Station (MS) for reporting state information, for example a state change information of joining or leaving a particular layer, in accordance with the embodiment of the present invention.

At the BS's side:
When the layered coded video is delivered from the upper layer, the classifier module in the MAC layer is configured to transform the IP address of application packets to service flow ID, and to record the Qos (Quality of Service) parameter information of the upper layer Service Data Units (SDU). The Qos parameters information may includes layer type, e.g. Base Layer, Enhancement Layer 1 and etc., for each layer as well as typical Qos parameters such as guaranteed data rate, delay and jitter. The data packets of different layers will be stored in the corresponding buffer for scheduling, such as Base Layer Queue and at least one Enhancement Layer Queue.

The scheduler module is configured to evaluate the Qos parameter information, combining with the feedback information reported from the PHY layer to allocate the bandwidth resource for each program based on a certain scheduling algorithm with the goal to increase the system effectiveness.

The link adaptation module is in charge of collecting the state information conveyed in the indication messages from at least one MS.

At the MS's side:
The channel estimation module is configured to measure one (or more) channel quality parameter(s) of a downlink channel, such as by estimating the CINR value of the downlink channel.

The service management module negotiates with the BS during the service creation and captures the condition table, and is also configured to determine whether or not to send out an indication message based on the at least one channel quality parameter of the downlink channel estimated by the channel estimation module. If it is determined that a message is to be sent, the indication message, such as an MBS_IND message shown below, is sent out to the BS for the reporting of the MS's state information. Wherein, when an MS initiates a dynamic service addition (DSA) request for an MBS service to the BS, the BS will send a response message containing each available layer's information, its corresponding threshold CINR value and connection identifier (CID) for the requested MBS service to the MS, and the MS will store the layer type, threshold CINR value and CID as the effective reception condition information in a table in the local memory during the lifetime of the MBS service. One person of ordinary skills in the relevant art will appreciate that the condition table can be stored in a device other than the MS. Therefore, in this application, the reception condition providing module is used to provide the reception condition information. But if the condition table is stored outside of the MS, the reception condition providing module should be able to enter into signal communication with the outside device so as to derive the reception condition information.

Figure 2:
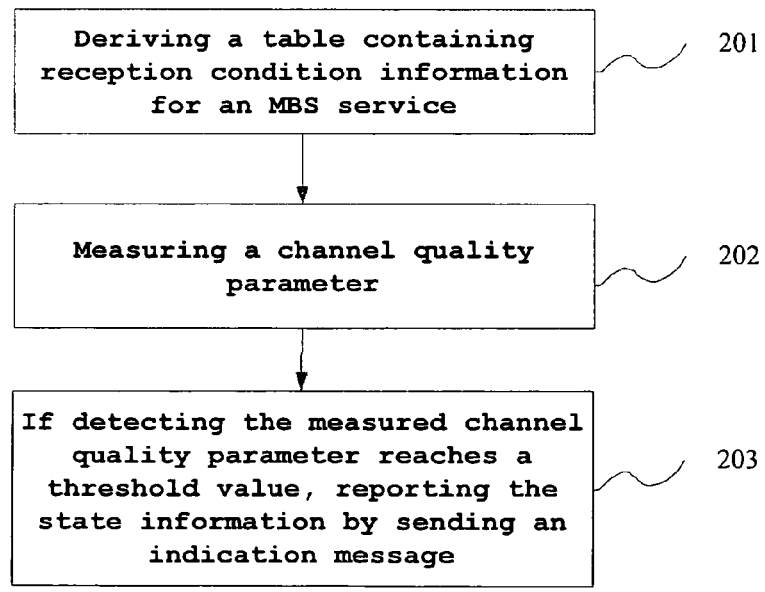
FIG. 2 is a flow chart illustrating the method carried out by the MS for reporting the state information according to the embodiment of the present invention.

FIG. 2 is a flow chart illustrating the method carried out by the MS for reporting the state information in accordance with the embodiment of the present invention.

In the step 201, the MS derives a table containing reception condition information for an MBS service, which the MS wants to receive.

As an example, the table is derived based on the following steps: when an MS sends a dynamic service addition (DSA) request to the BS requesting to join an MBS service during the establishment of the connection in the MAC layer, the BS transmits the DSA response message containing reception condition information so that the MS can derive the reception condition information from the received DSA response message; and the MS stores the derived reception information in a table of a storage device, and maintains the table during the lifetime of the multicast service. Below is a sample table of a 3-layer MBS service:

TABLE 1 sample table of a 3-layers MBS service

| Layer Type | CID | Effective Reception CINR (dB) |
| --- | --- | --- |
| Base Layer | 5000 | 5 |
| Enhancement Layer 1 | 5001 | 14 |
| Enhancement Layer 2 | 5002 | 20 |

As can be seen from the table 1, it contains the fields of layer type, CID (connection identifier) and effective reception CINR, records of which can all be derived from the DSA response message. The MBS service contains 3 layers, i.e. base layer, enhancement layer 1 and enhancement layer 2, with each layer associated with a CID and an effective reception CINR. The reception information contained in the sample table means that if the actual value of the current CINR reaches a threshold value of 5 dB, the MS is eligible to receive the data from the base layer of the requested MBS service; if the actual value of current CINR reaches another threshold value of 14 dB, the MS is eligible to additionally receive data from the enhancement layer 1; and when reaching the 20 dB, the MS is able to receive all data from base layer, enhancement layer 1 and enhancement layer 2. The CID here in the table is used to identify the different layers of an MBS service.

In one word, the reception condition information is used to indicate the conditions for triggering some actions, such as sending an indication message. As in the above table, the threshold values of CINR, i.e. 5 db, 14 db and 20 db, are the conditions for triggering the MS to send a message indicating the state change of the MS, i.e. joining or leaving a particular layer.

Figure 3:
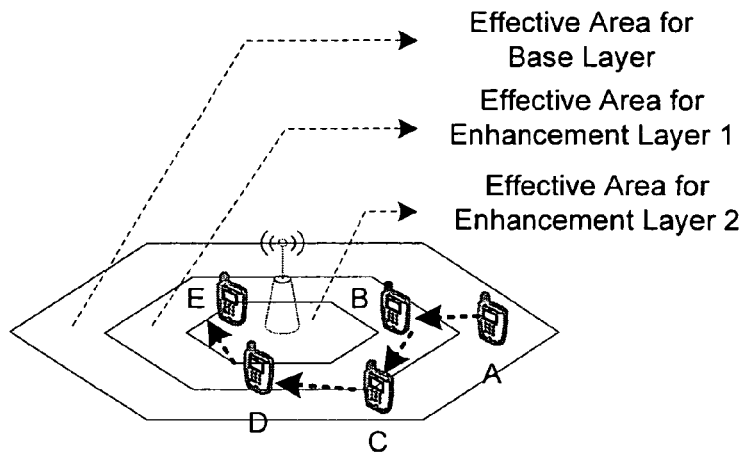
FIG. 3 is a diagram schematically illustrating an example of the move of an MS from position A to position E in accordance with the embodiment of the present invention.
Figure 4:
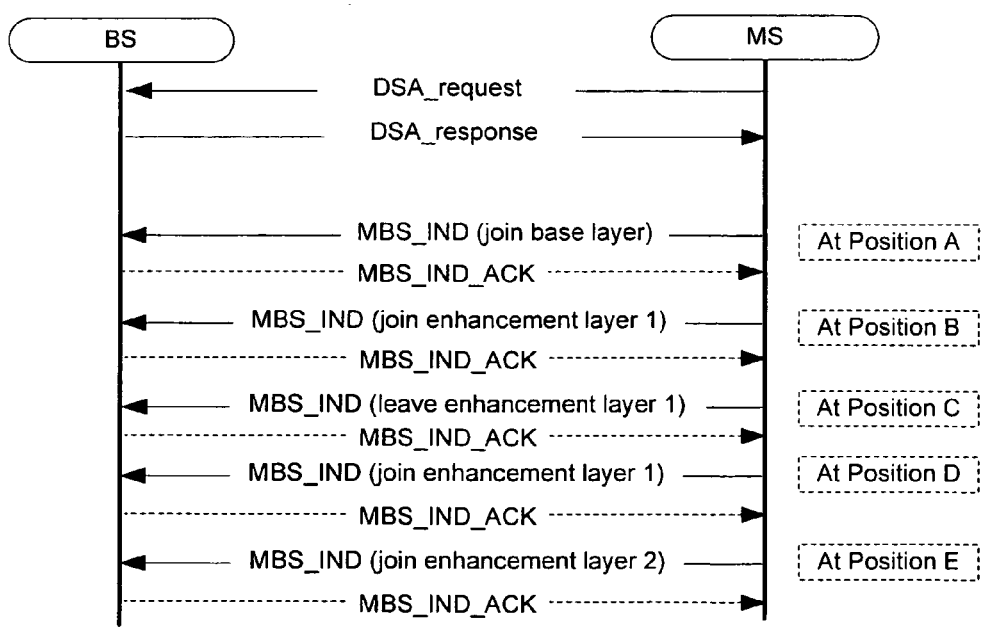
FIG. 4 is a message sequence chart illustrating the messages exchanged between the BS and the MS corresponding to the move of the MS shown in the FIG. 3 in accordance with the embodiment of the present invention.

FIG. 3 is a diagram schematically illustrating an example of the move of an MS from position A to position E in accordance with the embodiment of the present invention. And FIG. 4 is a message sequence chart illustrating the messages exchanged between the BS and the MS corresponding to the move of the MS shown in the FIG. 3 in accordance with the embodiment of the present invention. As shown in the FIG. 3, there are three receiving areas, which are the areas of enhancement layer 2, enhancement layer 1 and base layer from inside to outside. As shown in the FIG. 4, the MS locating at position A intends to join an MBS service of 3-layers, so the MS generates a table indicating the reception condition information for the requested MBS service during the connection establishment, and sends a message to the BS to indicate the fact of joining the base layer. When the MS moves to the position B, the MS finds the current CINR reaches the threshold value of enhancement layer 1. So it sends a message to the BS to indicate the joining enhancement layer 1. And for the subsequent move to position C, D and E, the MS is aware of the change of current CINR and sends to the BS a message indicating leaving enhancement layer 1, joining enhancement layer 1 and joining enhancement layer 2, separately. Generally, the indication message is transmitted on the control message connection in WiMAX to guarantee a transmission with low delay. Since more than one indication message may be sent out at the same time by different MSs, collision is not avoidable. Therefore, several subsequent trials can be adopted in the uplink competition interval so as to improve reliability. Furthermore, if some uplink traffic is already running in the WiMAX, the indication message can be transmitted by piggyback mode over the existing uplink connection with the advantage of reducing the probability of collision with other MSs.

One example of a format of an indication message is shown below in table 2:

TABLE 2

MBS_IND message format

| Syntax | Size | Notes |
|---|---|---|
| MBS_IND message format( ){ | | |
| Management message type | 8 bit | |
| Multicast CID | 16 bit | |
| Type | 1 bit | 1: Join 0: Leave |
| } | | |

Management message type field: it is used to indicate the control message type so as to be compatible with the current standard.

Multicast CID field: it is used to indicate the identifier of the connection, which can also be used to uniquely identify a layer of an MBS service.

Type field: it is used to indicate whether the MS joins or leaves a layer that is identified by the value of the Multicast CID field.

The MBS_IND_ACK message is used by the BS to notify the MS of the acknowledgement of correctly receiving the MBS_IND message. It is known to one of the skilled in the art that the acknowledgement message is not always necessary under some circumstances.

In the step 202, the MS measures a channel quality parameter, e.g. the CINR value from the downlink channel.

Many methods can be employed to estimate the CINR value of the channel.

If the CINR estimation from the preamble is to be carried out, then the estimated CINR value shall be an estimate of the CINR over the subcarriers of the preamble.

If the CINR estimation on a specific permutation zone is to be carried out, then the estimated CINR value shall be the average CINR on non-boosted data subcarriers of the zone.

Another possible method for estimating the CINR value of a single message is to compute the ratio of the sum of the signal power and the sum of the residual error for each data sample, using the following function:

$$CINR[k] = \frac{\sum_{n=0}^{N-1} |s[k,n]|^2}{\sum_{n=0}^{N-1} |r[k,n] - s[k,n]|^2}$$

Wherein r[k,n] is the received sample n within the message measured at time index k in frame units, and s[k,n] is the detected or pilot sample n within the message measured at time index k in frame units.

In the step 203, if the MS detects the measured channel quality parameter reaches a predetermined threshold value of the reception condition information, it will report its state information corresponding to the measured channel quality parameter by sending an indication message.

The MS measures the channel quality parameter, for example the CINR value. And once the measured CINR value reaches a threshold value of the reception condition information, the MS will determine its current state information corresponding to the measured channel quality parameter and then send an indication message to the BS to report its state information, for example, the state change information of joining/leaving a particular layer.

According to the embodiment of the present invention, the signaling overhead is reduced because only the MSs satisfying the requirement of reception condition information send the report message. Furthermore, because the MS sends the report message right after it determines the channel quality satisfies one reception condition, the accuracy of the reporting mechanism is augmented.

Optionally, in addition to the above steps, based on the statistical information on all MBS services derived from the indication messages sent by MSs, the BS dynamically adjusts the resource allocation with a scheduling algorithm so as to increase the system's effectiveness.

To achieve overall efficient spectral utilization for the MBS service, the BS performs resource allocation among MBS services. The resource scheduling is done periodically and we assume that the transmit power across different sub-channels is fixed and does not change during service transmission. For the convenience of the reader, notations used below are shown in the table 3.

TABLE 3

Notations list

| | |
|---|---|
| $\lambda_b$ | Base layer rate, |
| $\lambda_j^l$ | Enhancement layer l rate in multicast group j |
| $\lambda_{min}, \lambda_{max}$ | Minimal and Maximum value for enhancement layer |
| $e_i^j$ | Expected bandwidth for receiver i in multicast group j |
| $se_l^j$ | Spectrum Efficiency of layer l in multicast group j |
| $a_i^j$ | Assigned bandwidth for receiver i in multicast group j |
| $u_i^j$ | Utility ratio (IFR) for receiver i in multicast group j |
| $b^j$ | Bandwidth assigned for program j |
| $l^j$ | Enhancement layer number of program j |
| $U^j$ | The utility ratio of program j |
| U | The system utility ratio |
| B | Total available bandwidth in the system |
| P | Total number of video program in the system |
| $N_j^{enhance}$ | Number of receivers with enhancement layer reception capability in the program j |
| L | Maximum number of enhancement layer |

The satisfaction of an MS can be defined by the ratio of assigned bandwidth and expected bandwidth, denoting as $s_i^j = a_i^j/e_i^j$. Assuming the mapping of the MCS mode for each layer is predefined in the BS and synchronized with each MS, the transmission of different layers respectively has different spectrum efficiencies. Thus we can define the utility ratio function for MS i in multicast group j as $$u_i^l(j) = \begin{cases} s_i^1 * se_1^j & \text{if } l = 1 \\ \sum_{k=1}^{l^j} u_i^{k-1}(j) + s_i^l * se_l^j & \text{if } 1 < l < L, \end{cases}$$

which can reflect the combined consideration of channel spectrum efficiency and user satisfaction. The utility ratio for program j is the summation of the utility ratio values for all subscribers, i.e.

$$U^j = \sum_{i=1}^{N_j} u_i^l(j).$$

So, the system utility ratio $$U = \sum_{j=1}^{P} U^j = \sum_{j=1}^{P} \sum_{i=1}^{N_j} u_i^l(j)$$

is defined as the total utility ratio value for all programs or MBS services. In order to increase the system utility ratio U, two factors need to be considered:

(a) $\sum_{j=1}^{P} b^j \leq B$, total bandwidth benchmark (b) $\forall j, \lambda_b^j \geq \lambda_{min}$, minimal guaranteed base layer.

The requirement of factor (b) can be met by reserving the minimal guaranteed bandwidth for each program, but utility ratio increment problem is NP-hard.

A greedy algorithm named dynamic exception satisfaction (DES) is proposed to carry out the resource allocation.

Firstly, the bandwidth for the base layer region is reserved for each program. Secondly, for enhancement layer, an order list will be created as a function of the number of subscribers at a given point in time: the most popular programs will be assigned more resources according to the following two approaches:

(a) Allow all enhancement layers for this program
(b) Allocate more resources for at least one enhancement layer On the other hand, the less popular programs will be downgraded by releasing some enhancement layers or reducing bandwidth allocation.

Below is a pseudo-code for the algorithm.

```
// Initialization:
Step 1: Set available bandwidth BW=B,
Step 2: Generate condition table of MCS and layer;
Step 3: BW←BW−λ_b*P // reserve base layer for each program
// Normal Scheduling
Step 4: Statistics receiver number for each program N_j^enhance
        //by feedback
Step 5: ∀j∈P, Sorting N_enhance^j    // sort popularity exponent
        among all programs
Step 6: l ← 1: Start from the enhancement layer 1
Step 7: While (BW>0) && (some programs are not served)
        Switch (∀j∈P)
Step 8: Case  Top α% popular program: λ_j^l = λ_max,break
Step 9: Case Bottom β% program: if(λ_j^l−1 > 0) λ_j^l = λ_min,break
Step 10: Case  Normal program: if(λ_j^l−1 > 0) λ_j^l = λ{λ_min < λ < λ_max},
        break;
        End Switch
11.Calculate b^j for this program , BW← BW− b^j
12.1 ← 1 +1        //Move to next layer
End While
```

Considering the requirement of factor (b), we first reserve the resources for the base layer of each video program or MBS service $\lambda_{min}$ in step 3, which is fixed modulated by QPSK1/2.

The following steps from 4 to 12 are used by the greedy algorithm to allocate the remaining bandwidth based on the program popularity indicated by the number of subscribers located in the region with effective reception capability for enhancement layers. At the beginning of each scheduling processing, the statistic value of the subscriber distribution of each program is calculated in step 4. Then the bandwidth is allocated in the order of the enhancement layers, in each scheduling round, a program is served according to the increasing popularity. Those programs with more subscribers capable of receiving an enhancement layer will go into upgrade processing by adding an enhancement layer or increasing resources until $\lambda_{max}$ is reached (step 8). On the contrary, the bottom programs with fewer receivers should release resources by decreasing the data rate to $\lambda_{min}$. If for a layer $\lambda_{min}=0$, this layer will be removed. For a normal program, $\lambda_j^l$ can be set to a value between the boundaries $\lambda_{min}$ and $\lambda_{max}$, e.g. the bandwidth can be divided by a mean value or by using a proportioned fairness algorithm (in step 10). Considering the dependence among layers, if one layer is removed, the consecutive higher layers will also be eliminated. The iteration is done among video programs until the total available bandwidth is used up or all programs have already been served (step 7).

The DES algorithm can run in polynomial time. The complexity has two components, the first one being the sorting of popularity, which can be bound by $O(P*lg(P))$, where P is the number of multicast programs. The second one is the bandwidth allocation in each layer, the complexity of which can be bound by $O(P*L)$. Therefore the complexity is $O(P*lg(P))+O(P*L)$. Generally speaking, the number of programs in a system is a finite value, and a constant boundary E can be found for $lg(P)$, $lg(P)<E$, thus the proposed algorithm can be run in polynomial time so as to improve the system's effectiveness.

According to a variant of the present embodiment, the reception condition information is not transmitted during the connection establishment, but transmitted in a dedicated message after the establishment of connection.

According to a variant of the present embodiment, the table is periodically updated by the MS through the signal communication between the MS and the BS after the table is initially generated by the MS.

According to a variant of the present embodiment, the conditions for triggering the action of reporting may take into account the configuration of an MS. For example, some MS would like to improve video quality by subscribing to more layers, other mobile hosts may take into account power consumption or decoding capability and thereby subscribe to a limited number of layers.

According to a variant of the present embodiment, the message reported is not limited to the message indicative of joining/leaving a particular layer. One of ordinary skill in the pertinent arts will appreciate that other kinds of messages can be used to indicate the state information of the MS.

According to a variant of the present embodiment, a man skilled in the relevant art will appreciate that the MS can measure two or more channel quality parameters for more precise control. For example, besides the CINR, the variation downgrade/upgrade slope can be used as a criterion for triggering the action of reporting. Correspondingly, the reception condition information should comprise these corresponding two or more channel quality parameters.

According to a variant of the present embodiment, the reception condition information just contains the fields of effective reception CINR and an identifier that can uniquely identify a layer. And in the report message there is a field indicating the action to the layer, e.g. joining or leaving a layer.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention.

What is claimed is:

1. A method for reporting state information of a receiver device in a multicast or broadcast network, wherein a service is encoded into at least two layers by using layered coding technique and each layer corresponds to a predetermined threshold value indicating the eligibility to receive the layer in terms of channel quality, wherein predetermined threshold value of a higher layer among the at least two layers corresponds to a larger value, at the side of the receiver device,
   deriving predetermined threshold values for all of the at least two layers;
   Receiving a service through a subset of said at least two layers;
   Measuring a channel quality parameter;
   if the channel quality parameter increases to reach one of the predetermined threshold values, receiving said service through a modified subset of said at least two layers additionally including a higher layer that corresponds to the one of the predetermined threshold values but does not belong to the subset of said at least two layers, and if the channel quality parameter drops below another one of the predetermined threshold values, receiving said service through another modified subset of said at least two layers excluding a layer that corresponds to the another one of the predetermined threshold values; and
   transmitting state information of the receiver device indicating a change to said modified subset of said at least two layers.

2. The method according to claim 1, wherein, said at least two layers comprising a base layer containing minimum information for intelligibility and at least one enhancement layer containing additional information that incrementally improves the overall quality of said service.

3. The method according to claim 2, wherein, the decode of an enhancement layer is dependent on said base layer and its preceding enhancement layer, wherein, said subset of said at least two layers is chosen in a way that any layer in said subset has its necessary preceding layer in said subset.

4. The method according to claim 2, wherein, at least two other receiver devices are receiving services, characterized by comprising the step, for each of said at least two other receiver devices, in response to its channel quality parameter reaching said predetermined threshold value, transmitting its state information;
   wherein, adding an enhancement layer or releasing an enhancement layer for a service based on all state information sent by all receiver devices.

5. A receiver device for reporting state information while receiving a service that is encoded into at least two layers by using layered coding technique in a multicast or broadcast network, and each layer corresponds to a predetermined threshold value indicating the eligibility to receive the layer in terms of channel quality, wherein predetermined threshold value of a higher layer among the at least two layers corresponds to a larger value, wherein, it comprises:
   a reception condition providing module configured to providing predetermined threshold values for all of the at least two layers;
   a channel estimation module configured to measure the channel quality parameter of downlink channel, over which a service encoded in at least two layers is received through a subset of said at least two layers; and
   a service management module configured to transmit state information of said receiver device indicating a change to a modified subset of said at least two layers when changing to receive said service through said modified subset of said at least two layers, wherein if the channel quality parameter increases to reach one of the predetermined threshold values, receiving said service through a modified subset of said at least two layers additionally including a higher layer that corresponds to the one of the predetermined threshold values but does not belong to the subset of said at least two layers, and if the channel quality parameter drops below another one of the predetermined threshold values, receiving said service through another modified subset of said at least two layers excluding a layer that corresponds to the another one of the predetermined threshold values.

6. A device for resource allocation in a multicast or broadcast network, wherein, the network comprises at least two services and each service is encoded into at least two layers by using layered coding technique over a communication channel, and each layer corresponds to a predetermined threshold value indicating the eligibility to receive the layer in terms of channel quality, wherein predetermined threshold value of a higher layer among the at least two layers corresponds to a larger value, the device comprises:

a first module configured to receive state information from at least one receiver device, each receiver device is receiving a service through a subset of said at least two layers for the service, wherein the state information indicating change of subset of said at least two layers is transmitted by the receiver device when changing to receive said service through a modified subset of said at least two layers for the service, wherein if the channel quality parameter increases to reach one of the predetermined threshold values, receiving said service through a modified subset of said at least two layers additionally including a higher layer that corresponds to the one of the predetermined threshold values but does not belong to the subset of said at least two layers, and if the channel quality parameter drops below another one of the predetermined threshold values, receiving said service through another modified subset of said at least two layers excluding a layer that corresponds to the another one of the predetermined threshold values; and a second module configured to adjust bandwidth resource allocation of all services based on at least one receiver device's state information.

* * * * *